US009923591B2

(12) United States Patent
Bengtsson et al.

(10) Patent No.: US 9,923,591 B2
(45) Date of Patent: Mar. 20, 2018

(54) ARRAY ANTENNAS INCLUDING NON-UNIFORM ANTENNA ELEMENTS

(71) Applicant: Sony Corporation, Tokyo (JP)

(72) Inventors: Erik Bengtsson, Lund (SE); Zhinong Ying, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 115 days.

(21) Appl. No.: 14/539,611

(22) Filed: Nov. 12, 2014

(65) Prior Publication Data
US 2016/0134323 A1 May 12, 2016

(51) Int. Cl.
H04M 1/00 (2006.01)
H04B 1/40 (2015.01)
H04B 7/0413 (2017.01)
H04L 5/00 (2006.01)
H01Q 3/30 (2006.01)
H04B 7/04 (2017.01)
H04B 7/06 (2006.01)
H01Q 21/06 (2006.01)
(Continued)

(52) U.S. Cl.
CPC ............... H04B 1/40 (2013.01); H01Q 3/30 (2013.01); H01Q 21/065 (2013.01); H01Q 21/20 (2013.01); H01Q 21/22 (2013.01); H04B 7/04 (2013.01); H04B 7/0413 (2013.01); H04B 7/0691 (2013.01); H04L 5/0048 (2013.01); H04W 88/08 (2013.01)

(58) Field of Classification Search
CPC ....... H04B 1/40; H04B 7/0413; H04L 5/0048; H04W 88/08
See application file for complete search history.

(56) References Cited

U.S. PATENT DOCUMENTS

2002/0140616 A1* 10/2002 Kanamaluru .......... H01Q 25/00
343/756
2003/0016180 A1* 1/2003 James .................... H01Q 13/12
343/770
(Continued)

FOREIGN PATENT DOCUMENTS

WO WO 01/69722 A1 9/2001
WO WO 02/25775 A1 3/2002

OTHER PUBLICATIONS

Notification of Transmittal of the International Search Report and the Written Opinion of the International Searching Authority, or the Declaration, in corresponding PCT Application No. PCT/JP2015/002354, dated Jul. 16, 2015 (12 pages).
(Continued)

Primary Examiner — Keith Fang
(74) Attorney, Agent, or Firm — Myers Bigel, P.A.

(57) ABSTRACT

Network nodes including a non-uniform plurality of array antenna elements coupled to transceiver circuitry configured to provide communications in a cellular or short-range wireless network are provided. Sizes of the non-uniform plurality of array antenna elements, distances between adjacent ones of the non-uniform plurality of array antenna elements, tilt of the non-uniform plurality of array antenna elements, and/or antenna types of the non-uniform plurality of array antenna elements differ among the non-uniform plurality of array antenna elements.

9 Claims, 9 Drawing Sheets

(51) Int. Cl.
*H01Q 21/20* (2006.01)
*H01Q 21/22* (2006.01)
*H04W 88/08* (2009.01)

(56) References Cited

U.S. PATENT DOCUMENTS

| | | | | |
|---|---|---|---|---|
| 2003/0151548 A1* | 8/2003 | Kingsley | ............. | H01Q 3/24 342/368 |
| 2009/0005120 A1* | 1/2009 | Ylitalo | ............. | H04B 7/0667 455/562.1 |
| 2012/0171972 A1* | 7/2012 | Huang | ............. | H01Q 1/246 455/90.2 |
| 2015/0288438 A1* | 10/2015 | Maltsev | ............. | H01Q 3/40 455/101 |

OTHER PUBLICATIONS

Ye et al., "Design of feed networks in irregular planar arrays", Antenna Technology (IWAT), 2011 International Workshop on, IEEE, Mar. 7, 2011, pp. 294-297.

\* cited by examiner

ARRAY ANTENNAS INCLUDING NON-UNIFORM ANTENNA ELEMENTS

FIELD

The present inventive concepts generally relate to the field of wireless communications.

BACKGROUND

Omnidirectional cylindrical or spherical array antennas can be expensive and aesthetically unpleasant. On the other hand, flat array antennas that are not omnidirectional may perform unequally at different angles within an intended coverage range spanning 180 degrees or fewer. For example, blind angles within the intended coverage range may reduce antenna performance. Moreover, side lobe radiation may waste energy and cause interference problems.

SUMMARY

Various embodiments of present inventive concepts provide a network node including transceiver circuitry configured to provide communications in a cellular or short-range wireless network. Moreover, the network node includes a non-uniform plurality of array antenna elements coupled to the transceiver circuitry and including a plurality of columns and/or a plurality of rows of array antenna elements on a common, continuous surface. Sizes of the non-uniform plurality of array antenna elements, distances between adjacent ones of the non-uniform plurality of array antenna elements, antenna types of the non-uniform plurality of array antenna elements, and/or tilt angles of the non-uniform plurality of array antenna elements differ among the non-uniform plurality of array antenna elements.

According to various embodiments, the plurality of columns and/or plurality of rows of array antenna elements may include a first group of the non-uniform plurality of array antenna elements that is adjacent a second group of the non-uniform plurality of array antenna elements. In some embodiments, the first group may include an array including the plurality of columns and/or plurality of rows of antenna elements. Each antenna element in the array may be coupled to a different antenna feed, whereas the second group includes a sub-array including a plurality of antenna elements that are coupled to the same antenna feed. In some embodiments, the sub-array includes a first sub-array including a first plurality of antenna elements that are coupled to a first same antenna feed, and the second group includes a second sub-array including a second plurality of antenna elements that are coupled to a second same antenna feed. Additionally or alternatively, the sub-array may be configured to be controlled by the circuit to mechanically tilt independently of the first group of the non-uniform plurality of antenna elements.

In various embodiments, the network node may include a processor coupled to the transceiver circuitry and configured to receive an uplink pilot signal and feed the non-uniform plurality of array antenna elements with a signal that is based on the uplink pilot signal. Additionally or alternatively, the transceiver circuitry may include cellular base station transceiver circuitry coupled to the non-uniform plurality of array antenna elements. In some embodiments, the transceiver circuitry may include massive Multiple-Input Multiple-Output (MIMO) cellular base station transceiver circuitry coupled to the non-uniform plurality of array antenna elements. Moreover, in some embodiments, the transceiver circuitry may include Wi-Fi base station transceiver circuitry coupled to the non-uniform plurality of array antenna elements.

According to various embodiments, the non-uniform plurality of array antenna elements may be on a non-spherical and non-cylindrical surface, and the transceiver circuitry may be non-satellite transceiver circuitry. In some embodiments, the non-uniform plurality of array antenna elements may be on a flat surface. Alternatively, the non-uniform plurality of array antenna elements may be on a non-planar surface, such as a semi-spherical or semi-cylindrical surface. Moreover, some, but not all, of the non-uniform plurality of array antenna elements may be patch antenna elements.

A massive Multiple-Input Multiple-Output (MIMO) array antenna, according to various embodiments, may include a plurality of massive MIMO array antenna elements coupled to transceiver circuitry that is configured to provide communications in a cellular or short-range wireless network. Sizes of the massive MIMO array antenna elements, distances between adjacent ones of the massive MIMO array antenna elements, antenna types of the massive MIMO array antenna elements, and/or tilt angles of the massive MIMO array antenna elements may differ among the massive MIMO array antenna elements. In some embodiments, the massive MIMO array antenna elements may be on a flat surface, a semi-spherical surface, or a semi-cylindrical surface, and the massive MIMO array antenna elements may be configured to be fed with a signal that is based on an uplink pilot signal. Additionally or alternatively, some, but not all, of the massive MIMO array antenna elements may be patch antenna elements, and the transceiver circuitry may include massive MIMO cellular base station transceiver circuitry coupled to the massive MIMO array antenna elements.

An irregular array antenna, according to various embodiments, may include a plurality of irregular array antenna elements coupled to transceiver circuitry that is configured to provide communications in a cellular or short-range wireless network. Sizes of the irregular array antenna elements, distances between adjacent ones of the irregular array antenna elements, antenna types of the irregular array antenna elements, and/or tilt angles of the irregular array antenna elements may differ among the irregular array antenna elements. Moreover, the irregular array antenna elements may be configured to be fed with a signal that is based on an uplink pilot signal, and the irregular array antenna elements may be on a flat surface, a semi-spherical surface, or a semi-cylindrical surface. In some embodiments, some, but not all, of the irregular array antenna elements may be patch antenna elements. Additionally or alternatively, the transceiver circuitry may include massive Multiple-Input Multiple-Output (MIMO) cellular base station transceiver circuitry that is coupled to the irregular array antenna elements.

Other devices, nodes, and/or systems according to embodiments of the inventive concepts will be or become apparent to one with skill in the art upon review of the following drawings and detailed description. It is intended that all such additional devices, nodes, and/or systems be included within this description, be within the scope of the present inventive concepts, and be protected by the accompanying claims. Moreover, it is intended that all embodiments disclosed herein can be implemented separately or combined in any way and/or combination.

DETAILED DESCRIPTION OF EMBODIMENTS

Figure 1A:
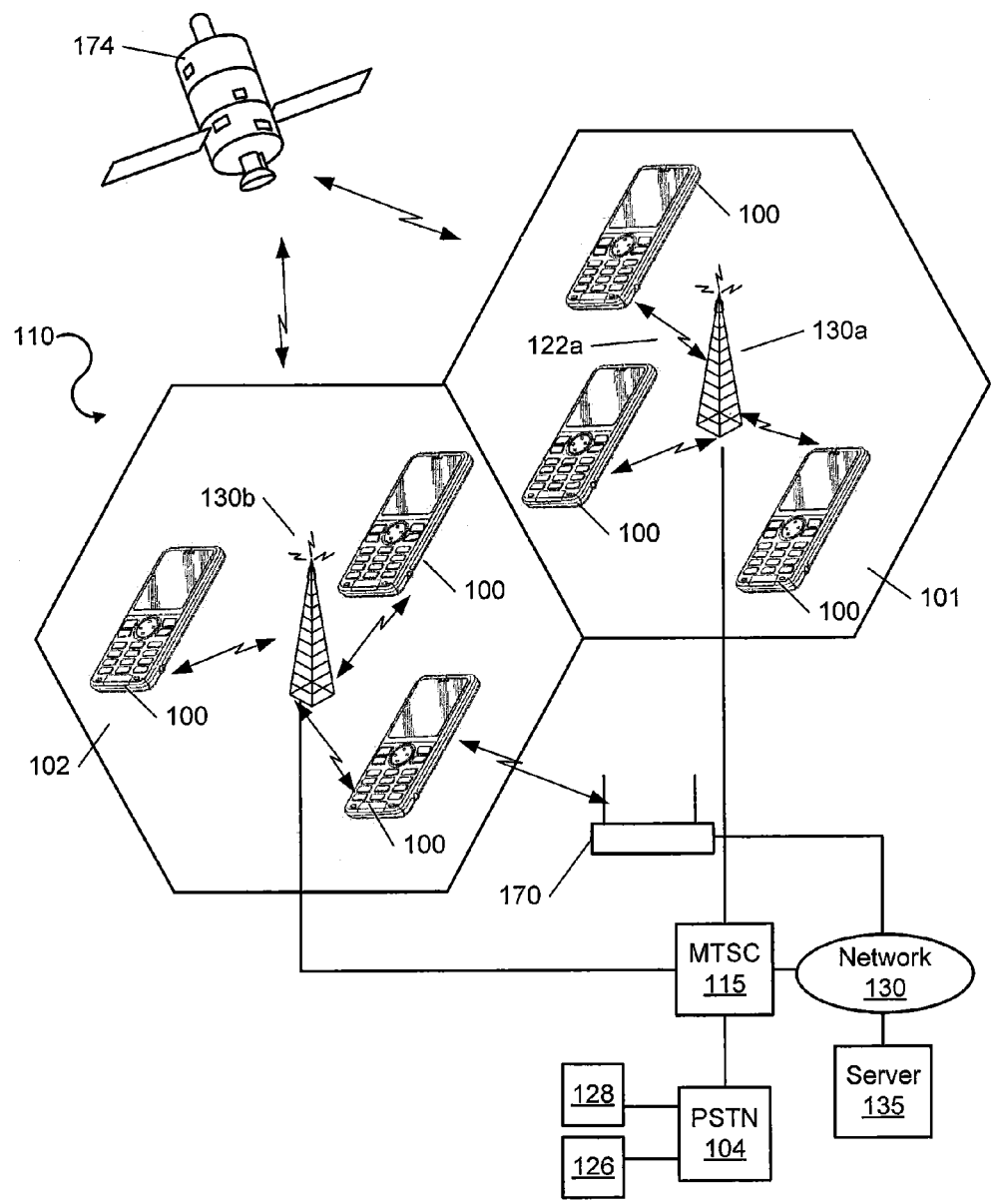
FIG. 1A is a schematic diagram of a communication system that includes a wireless network node, according to some embodiments of present inventive concepts.

The present inventive concepts now will be described more fully with reference to the accompanying drawings, in which embodiments of the inventive concepts are, shown. However, the present application should not be construed as limited to the embodiments set forth herein. Rather, these embodiments are provided so that this disclosure will be thorough and complete, and to fully convey the scope of the embodiments to those skilled in the art. Like reference numbers refer to like elements throughout.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, steps, operations, elements, and/or components, but do not preclude the presence or addition of one or more other features, steps, operations, elements, components, and/or groups thereof.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein, the term "and/or" includes any and all combinations of one or more of the associated listed items.

Spatially relative terms, such as "above," "below," "upper," "lower," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which these embodiments belong. It will be further understood that terms, such as those defined in commonly-used dictionaries, should be interpreted as having a meaning that is consistent with their meaning in the context of the relevant art and will not be interpreted in an idealized or overly-formal sense unless expressly so defined herein.

Some base station antennas may attempt to communicate with wireless electronic devices on all sides of the base station antenna. For example, FIG. 2A (which will also be described following the description of FIGS. 1A-1C herein) illustrates a base station 230a that includes an omnidirectional cylindrical array antenna including antenna elements 237. The omnidirectional cylindrical array antenna of the base station 230a, however, may be expensive and aesthetically unpleasant and may circumscribe a large amount of space.

Figure 2A:
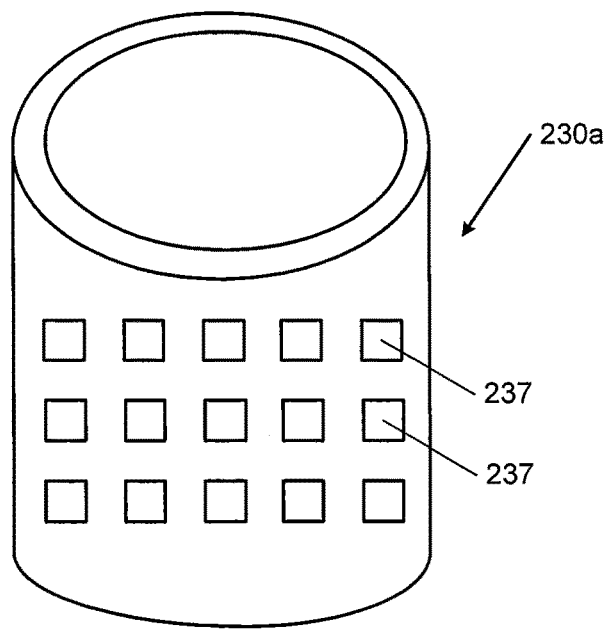
FIG. 2A illustrates a diagram of a base station that includes a cylindrical array antenna, according to the prior art.
Figure 2B:
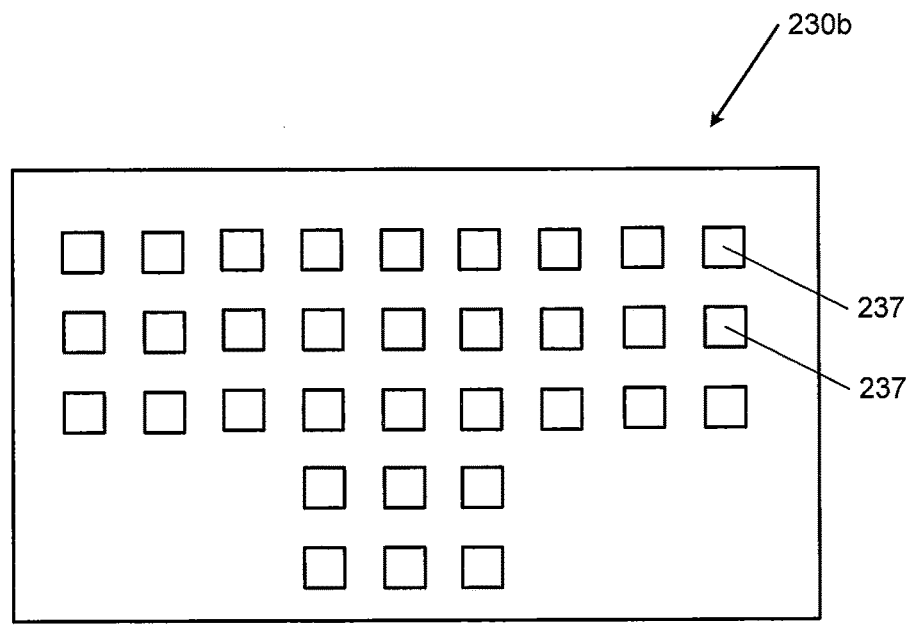
FIG. 2B illustrates a diagram of a base station that includes a flat array antenna including uniform antenna elements, according to the prior art.

As an alternative to the omnidirectional cylindrical array antenna of the base station 230a of FIG. 2A, FIG. 2B illustrates a base station 230b that includes a flat array antenna including antenna elements 237. The flat array antenna of the base station 230b may be less expensive and more aesthetically pleasant than the omnidirectional cylindrical array antenna of the base station 230a. Also, the flat array antenna may obstruct a smaller amount of space than the omnidirectional cylindrical array antenna. Performance, however, may be compromised with the flat array antenna because the flat array antenna may provide different performance levels at different angles. As an example, the flat array antenna may suffer from one or more blind angles at which the flat array antenna provides weak signal coverage. Moreover, although it may be possible to tilt the entire flat array antenna in a particular direction toward a particular User Equipment (UE), tilting the entire flat array antenna in a particular direction to benefit a particular UE may not benefit other UEs that are in different directions.

Various embodiments of present inventive concepts, however, provide improved antenna performance in comparison with the flat array antenna of the base station 230b of FIG. 2B, without requiring use of the expensive, bulky, and aesthetically unpleasant omnidirectional cylindrical array antenna of the base station 230a of FIG. 2A. For example, in comparison with the uniform, regularly-spaced antenna elements 237 of the flat array antenna of the base station 230b of FIG. 2B, various embodiments of present inventive concepts provide improved antenna performance by using an irregular array of antenna elements. In particular, whereas the antenna elements 237 of the flat array antenna of the base station 230b of FIG. 2B are all patch antenna elements having the same size and spacing with respect to each other, various embodiments of present inventive concepts provide an irregular array of antenna elements.

The irregularity of an array according to various embodiments of present inventive concepts may be provided (a) by using antenna elements having different sizes, (b) by using antenna elements having different distances therebetween, (c) by using different types of antenna elements, and/or (d) by using antenna elements with different tilt angles (e.g., by controlling mechanical tilting of at least one antenna element independently of controlling tilting other antenna elements and/or by using an array that is arranged/printed on a surface such that individual elements have different respective tilt angles). Moreover, as used herein, the terms "irregular" and "non-uniform" may each refer to one or more of such differences (a)-(d) among antenna elements in an array. As a result of the irregularity of the array, a flat array antenna may be provided that has a reduced need for mechanical tuning (e.g., tuning with respect to radiation direction).

Referring to FIG. 1A, a schematic diagram is provided of a wireless communication network 110 that supports communications in which wireless electronic devices 100 can be used according to various embodiments of present inventive concepts. The network 110 may include cells 101, 102 and base stations 130a, 130b in the respective cells 101, 102. Networks 110 may be used to provide voice and data communications to subscribers using various radio access standards/technologies. The network 110 illustrated in FIG. 1A may include wireless electronic devices 100 that may communicate with the base stations 130a, 130b. The wireless electronic devices 100 in the network 110 may additionally or alternatively communicate with a Global Positioning System (GPS) satellite 174, a local wireless network 170, a Mobile Telephone Switching Center (MTSC) 115, and/or a Public Service Telephone Network (PSTN) 104 (i.e., a "landline" network).

The wireless electronic devices 100 can communicate with each other via the MTSC 115. The wireless electronic devices 100 can also communicate with other devices/terminals, such as terminals 126, 128, via the PSTN 104 that is coupled to the network 110. As also shown in FIG. 1A, the MTSC 115 may be coupled to a computer server 135 via a network 130, such as the Internet.

The network 110 may be organized as cells 101, 102 that collectively can provide service to a broader geographic region. In particular, each of the cells 101, 102 can provide service to associated sub-regions (e.g., regions within the hexagonal areas illustrated by the cells 101, 102 in FIG. 1A) included in the broader geographic region covered by the network 110. More or fewer cells can be included in the network 110, and the coverage areas for the cells 101, 102 may overlap. The shape of the coverage area for each of the cells 101, 102 may be different from one cell to another and is not limited to the hexagonal shapes illustrated in FIG. 1A. The base stations 130a, 130b in the respective cells 101, 102 can provide wireless communications between each other and the wireless electronic devices 100 in the associated geographic region covered by the network 110.

Each of the base stations 130a, 130b can transmit/receive data to/from the electronic devices 100 over an associated control channel. For example, the base station 130a in cell 101 can communicate with one of the wireless electronic devices 100 in cell 101 over a control channel 122a. The control channel 122a can be used, for example, to page a wireless electronic device 100 in response to calls directed thereto or to transmit traffic channel assignments to the wireless electronic device 100 over which a call associated therewith is to be conducted.

The wireless electronic devices 100 may also be capable of receiving messages from the network 110 over the respective control channels 122a. In various embodiments, the wireless electronic devices 100 may receive Short Message Service (SMS), Enhanced Message Service (EMS), Multimedia Message Service (MMS), and/or Smartmessaging™ formatted messages.

The GPS satellite 174 can provide GPS information to the geographic region including cells 101, 102 so that the wireless electronic devices 100 may determine location information. The network 110 may also provide network location information as the basis for the location information applied by the wireless electronic devices 100. In addition, the location information may be provided directly to the server 135 rather than to the wireless electronic devices 100 and then to the server 135. Additionally or alternatively, the wireless electronic devices 100 may communicate with the local wireless network 170 (e.g., Wi-Fi or Bluetooth).

Figure 1B:
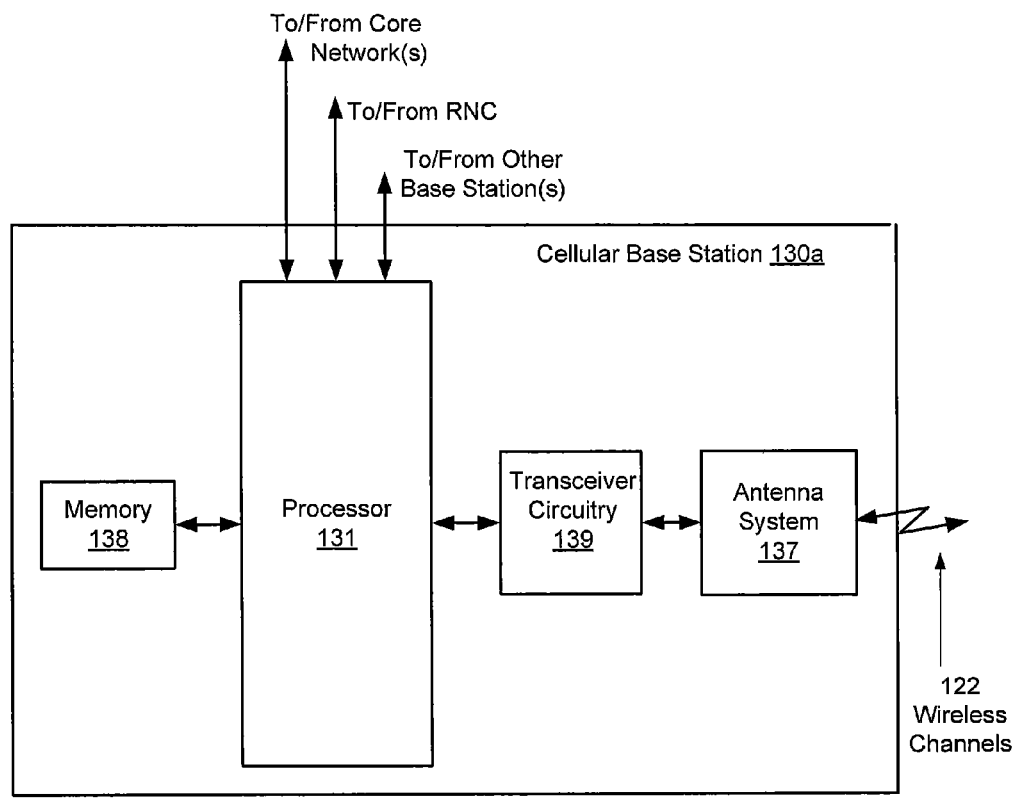
FIG. 1B illustrates a block diagram of a cellular base station, according to some embodiments of present inventive concepts.

Referring now to FIG. 1B, a block diagram is provided of a cellular base station 130a, according to some embodiments of present inventive concepts. The cellular base station 130a of FIG. 1B may represent either of the base stations 130a, 130b illustrated in FIG. 1A. Moreover, the cellular base station 130a of FIG. 1B may be configured to provide any type of cellular communications, including, for example, 2G, 3G, 4G, 5G, LTE, or other cellular communications.

FIG. 1B illustrates that the cellular base station 130a can be connected directly to one or more core networks and can communicate over wireless channels 122 (including, e.g., the control channel 122a of FIG. 1A) with wireless electronic devices 100 (also referred to as mobile stations, wireless terminals, user equipment nodes, or UEs) that are within their respective communication service cells (also referred to as coverage areas). Moreover, the cellular base station 130a can communicate with one or more other cellular base stations, and with a Radio Network Controller (RNC), using interfaces known to those skilled in the art.

As is further illustrated in FIG. 1B, the cellular base station 130a can include transceiver circuitry 139 coupled between a processor 131 and an antenna system 137 (e.g., including an array of multiple antennas), and a memory 138 coupled to the processor 131. Accordingly, the base station processor 131 is configured to transmit communications through the transceiver circuitry 139 and the antenna system 137 for reception at a wireless electronic device 100. In the other direction, the wireless electronic device 100 transmits communications for reception at the base station processor 131 through the antenna system 137 and the transceiver circuitry 139. To support Multiple-Input Multiple-Output (MIMO), which allows parallel transmission of multiple layers/streams of data, the antenna system 137 can include an array of antenna elements. Moreover, the inventive entity appreciates that a wireless electronic device 100 communicating with the cellular base station 130a may be, for example, a cellular radiotelephone, a smart phone, a laptop/netbook/tablet/handheld computer, or any other device capable of providing wireless communications.

Referring still to FIG. 1B, the transceiver circuitry 139 of the cellular base station 130a may include a plurality of transceivers coupled between the base station processor 131 and respective groups of antenna elements. More particularly, each transceiver may include a receiver supporting uplink communications with a wireless electronic device 100 and a transmitter supporting downlink communications with the wireless electronic device 100.

Figure 1C:
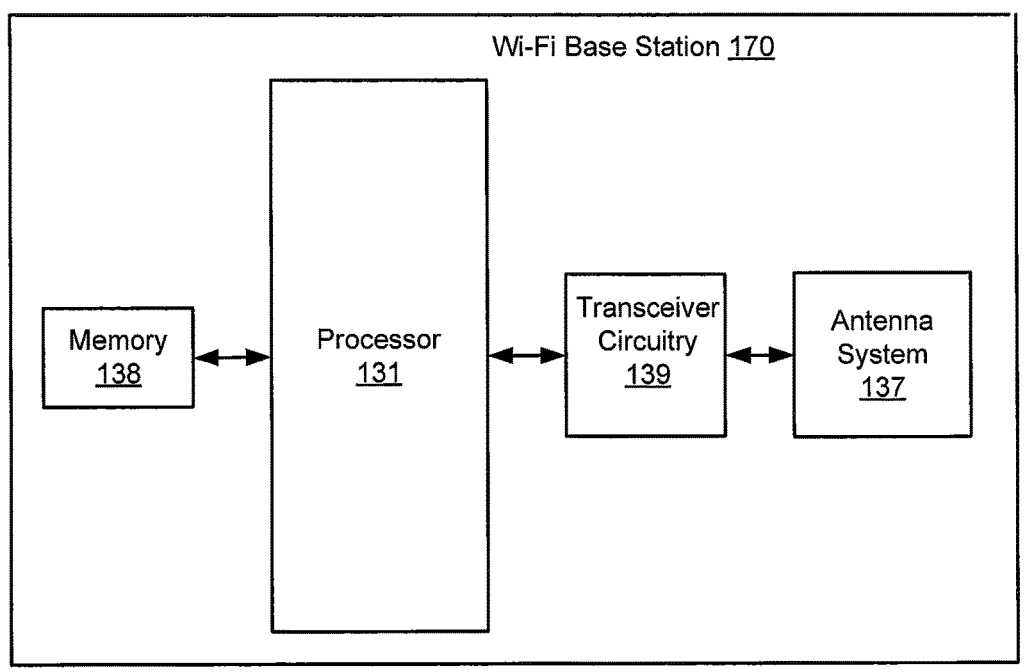
FIG. 1C illustrates a block diagram of a Wi-Fi base station, according to some embodiments of present inventive concepts.

Referring now to FIG. 1C, a block diagram is provided of a Wi-Fi base station 170, according to some embodiments of present inventive concepts. Although illustrated as representing a Wi-Fi base station 170 in FIG. 1C, the block diagram in FIG. 1C may represent any base station of a local wireless network 170, including, for example, a Bluetooth base station or any other short-range wireless network base station. Moreover, repeated descriptions of the blocks of the block diagram in FIG. 1C may be omitted, as these blocks represent the same or similar structures/features as those described herein with respect to the blocks illustrated in FIG. 1B. Furthermore, the term "network node," as used herein, may refer to a cellular base station 130a, a base station of a local wireless network 170, or any other electronic device including an irregular array antenna according to various embodiments of present inventive concepts.

Referring again to FIGS. 2A and 2B, the omnidirectional cylindrical array antenna of the base station 230a and the uniform elements of the flat array antenna of the base station 230b may suffer from cost/bulkiness/aesthetic disadvantages and performance disadvantages, respectively. Various embodiments of present inventive concepts, however, may address these disadvantages by providing an irregular array antenna (which may also be referred to as a non-uniform array antenna).

For example, FIGS. 3A-3F illustrate diagrams of a base station having an irregular array antenna according to some embodiments of present inventive concepts. In particular, the irregularity of the array may be provided by antenna elements having different (a) sizes, (b) spacings, and/or (c) antenna types. Additionally or alternatively, the irregularity of the array may be provided by using a circuit to control mechanical tilting of at least one of the antenna elements independently of controlling tilting of other ones of the antenna elements, and/or by using an array that is arranged/printed on a surface such that individual antenna elements have different respective tilt angles.

Figure 3A:
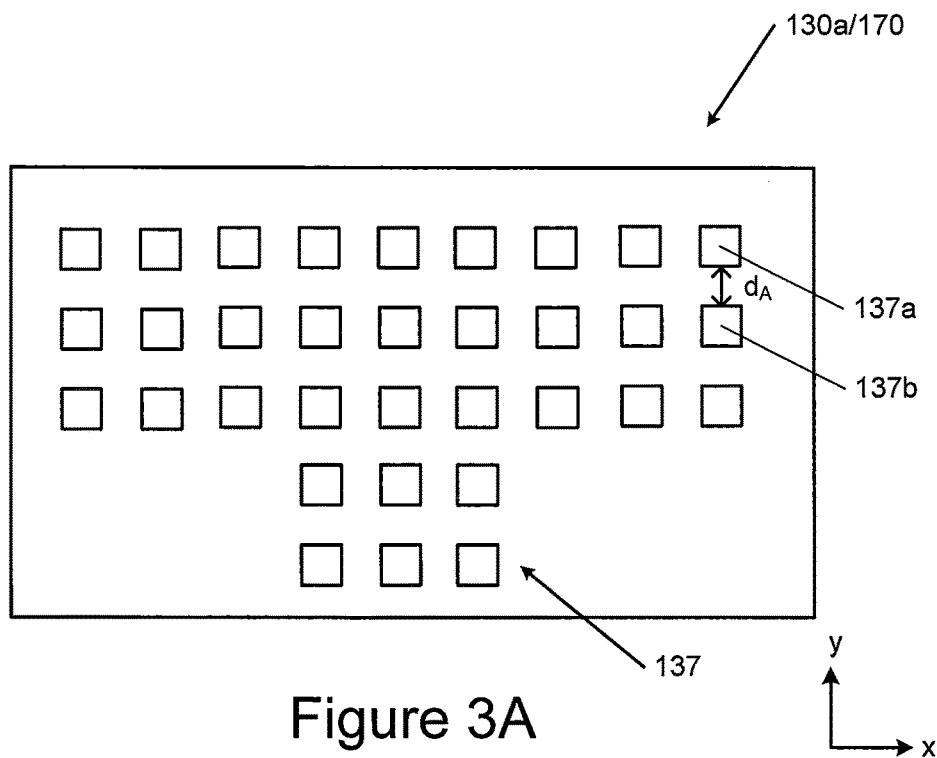
FIGS. 3A-3F illustrate diagrams of a base station that includes an irregular array antenna, according to some embodiments of present inventive concepts.

As an example, referring now to FIG. 3A, a diagram of a cellular base station 130a (or a wireless local area network base station 170) illustrates an antenna system 137 that is irregular because it includes a plurality of types of antenna elements. For example, FIG. 3A illustrates that the antenna system 137 includes an antenna element 137a that has a different antenna type from an antenna element 137b of the antenna system 137. As an example, the antenna element 137a may be a patch antenna, whereas the antenna element 137b may be a monopole antenna. In other words, in some embodiments, some, but not all, of the non-uniform plurality of antenna elements 137a/137b may be patch antenna elements. The inventive entity appreciates, however, that the different types of antenna elements 137a and 137b may be any different types of antenna elements.

A distance $d_A$ (in the y-direction) between the two different types of antenna elements 137a and 137b may optionally be the same as the distance in the y-direction between any two adjacent antenna elements in the antenna system 137 illustrated in FIG. 3A. Similarly, the distance in the x-direction between the antenna element 137a and an adjacent element may optionally be the same as the distance in the x-direction between any two adjacent antenna elements. In other words, all of the antenna elements of the antenna system 137 may optionally be uniformly spaced.

Figure 3B:
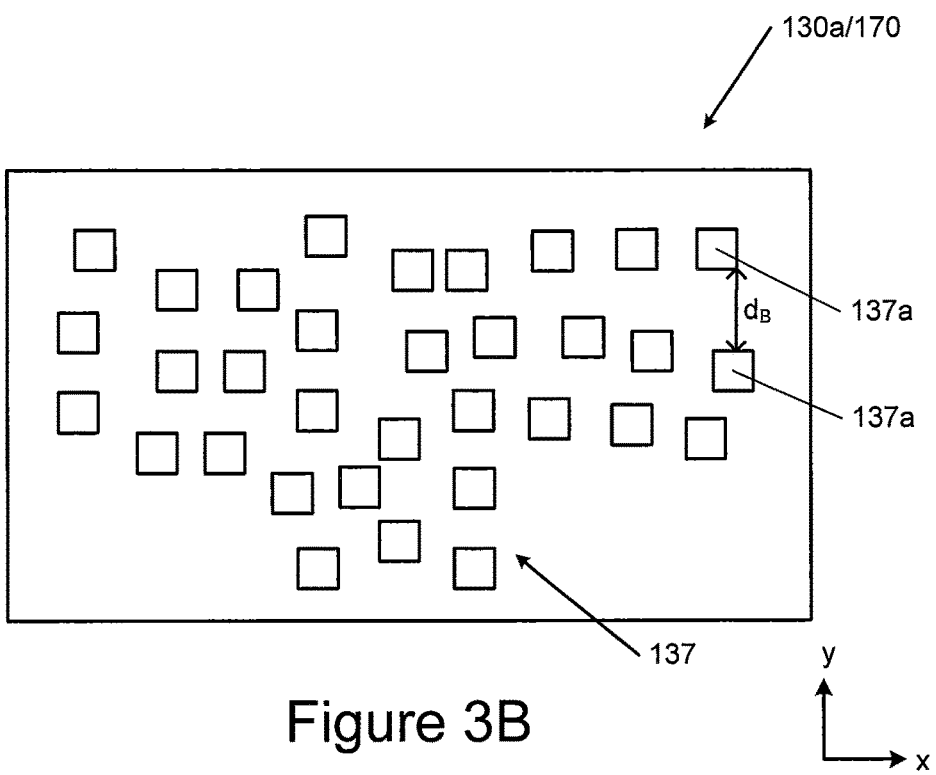

Alternatively, referring now to FIG. 3B, the antenna elements of an antenna system 137 may be non-uniformly spaced. In other words, the antenna system 137 of FIG. 3B is irregular because the distance between different pairs of adjacent antenna elements is not uniform. For example, FIG. 3B illustrates a distance $d_B$ (in the y-direction) between a pair of antenna elements 137a that is longer than the distance in the y-direction between other pairs of antenna elements in the antenna system 137. Similarly, the distance in the x-direction between one of the antenna elements 137a and an adjacent element may optionally be longer or shorter than the distance in the x-direction between other pairs of adjacent antenna elements.

Figure 3C:
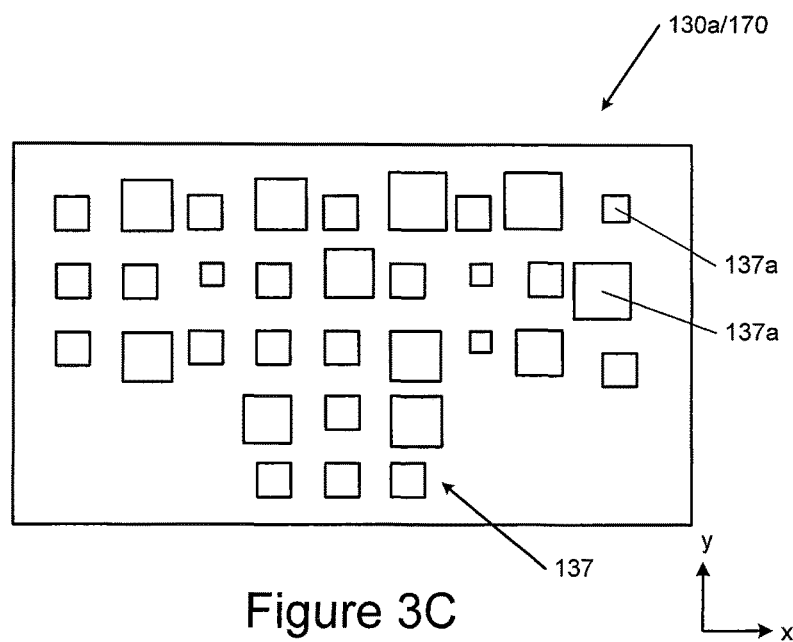

Referring now to FIG. 3C, a diagram of a cellular base station 130a (or a wireless local area network base station 170) illustrates an antenna system 137 that is irregular because it includes a plurality of sizes of antenna elements. For example, one antenna element 137a may be larger (e.g., may have a larger surface area in the x-y plane) than another antenna element 137a.

Moreover, the inventive entity appreciates that embodiments of two or more of FIGS. 3A-3C may be combined with one another. For example, FIGS. 3A and 3B may be combined to provide different types of antenna elements 137a and 137b that are also spaced apart from each other at a distance (e.g., a distance $d_B$ in the y-direction or a distance in the x-direction) that is different from a distance between another pair of adjacent antenna elements in the antenna system 137. As another example, FIGS. 3A and 3C may be combined to provide different types of antenna elements 137a and 137b that also have different sizes. As yet another example, FIGS. 3B and 3C may provide antenna elements that are non-uniformly spaced apart from each other and vary in size. Moreover, in some embodiments, each of FIGS. 3A-3C may be combined to provide different types of antenna elements 137a and 137b that also have different sizes and are spaced apart from each other at a distance that is different from a distance between another pair of adjacent antenna elements in the antenna system 137.

Figure 3D:
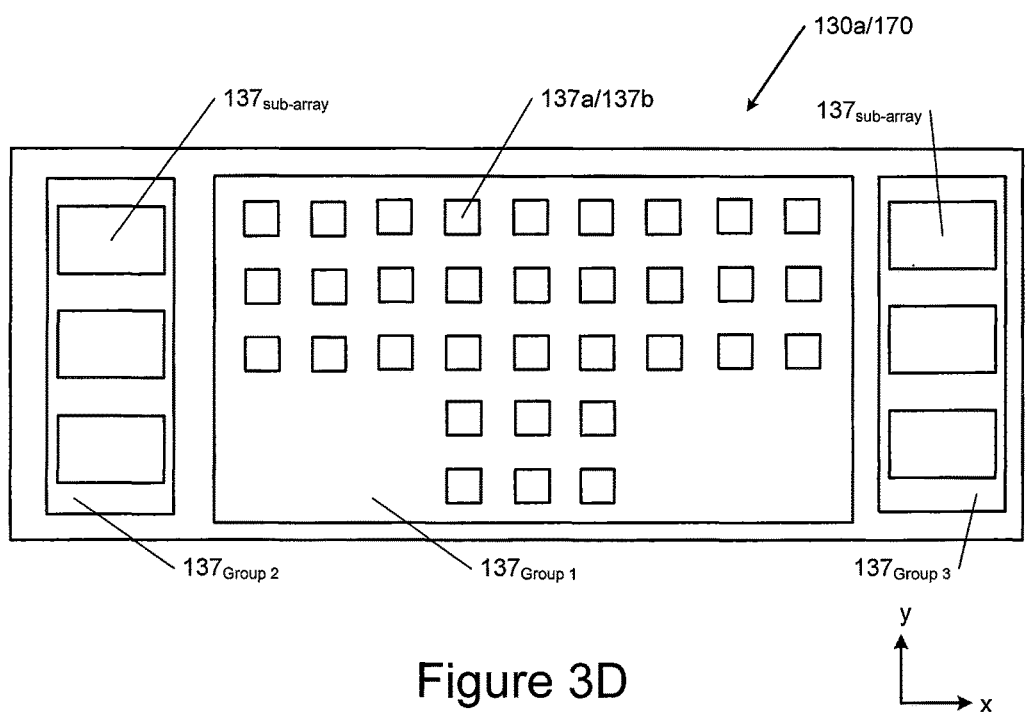

Referring now to FIG. 3D, a diagram of a cellular base station 130a (or a wireless local area network base station 170) illustrates an antenna system 137 that is irregular because it includes one or more sub-arrays $137_{sub-array}$ of antenna elements, in addition to a group $137_{Group\ 1}$ of antenna elements 137a/137b that are in an array but not a sub-array $137_{sub-array}$. For example, the antenna system 137 may include one or more of the sub-arrays $137_{sub-array}$ illustrated in group $137_{Group\ 2}$ or group $137_{Group\ 3}$ of FIG. 3D.

Each sub-array $137_{sub-array}$ includes a plurality of antenna elements that are combined to use a single feed. For example, a sub-array $137_{sub-array}$ may include two, three, four, or more antenna elements 137a/137b, and the entire sub-array $137_{sub-array}$ is fed by one cable. Accordingly, antenna elements using the same antenna feed are clustered together such that each sub-array $137_{sub-array}$ has its own feed. The array illustrated as group $137_{Group\ 1}$, on the other hand, is not a sub-array $137_{sub-array}$ and may use a different (e.g., independent), individual feed (and, optionally, a different transceiver) for each antenna element 137a/137b therein. Moreover, the combination of antenna elements in the sub-array $137_{sub-array}$ creates an antenna radiation pattern that differs from the individual radiation patterns of the antenna elements therein. In other words, although each sub-array $137_{sub-array}$ may act/function as a single antenna element, the radiation pattern of a given sub-array $137_{sub-array}$ looks different from the radiation patterns of the individual antenna elements therein.

Furthermore, the plurality of antenna elements of a sub-array $137_{sub-array}$ may be phase-locked elements that are each fed with the same signal. Despite being fed with the same signal, however, different ones of the plurality of antenna elements of a sub-array $137_{sub-array}$ use the signal at a slightly different phase, which may result in tilting a beam/radiation pattern provided by the sub-array $137_{sub\text{-}array}$. Moreover, in some embodiments, the plurality of antenna elements of a sub-array $137_{sub\text{-}array}$ may be irregular within the sub-array $137_{sub\text{-}array}$ itself. For example, a sub-array $137_{sub\text{-}array}$ may include different types of antenna elements (e.g., a patch antenna element vs. a monopole antenna element), different sizes of antenna elements, and/or different distances between different pairs of antenna elements.

Referring still to FIG. 3D, although two groups $137_{Group\ 2}$ and $137_{Group\ 3}$ of sub-arrays $137_{sub\text{-}array}$ are illustrated, the inventive entity appreciates that more or fewer groups of sub-arrays $137_{sub\text{-}array}$ may be provided in a cellular base station 130a (or a wireless local area network base station 170). Moreover, although three sub-arrays $137_{sub\text{-}array}$ are illustrated in each of the two groups $137_{Group\ 2}$ and $137_{Group\ 3}$, the inventive entity appreciates that more or fewer sub-arrays $137_{sub\text{-}array}$ may be provided therein.

Furthermore, the quantity (including the quantity of rows in the x-direction, columns in the y-direction, and/or of the total quantity of individual ones) of antenna elements in the array illustrated as group $137_{Group\ 1}$ in FIG. 3D is provided merely by way of example and may be increased or decreased. For example, the group $137_{Group\ 1}$ may, in some embodiments, include dozens, hundreds, or even thousands, or antenna elements. Similarly, the quantity of the antenna elements (e.g., the antenna elements 137a/137b) in FIGS. 3A-3C may be increased or decreased, and may include dozens, hundreds, or even thousands, of antenna elements. In other words, the quantity of antenna elements may increase or decrease in the x-direction and/or the y-direction in comparison with what is illustrated in FIGS. 3A-3C (or FIG. 3D). Moreover, although the antenna elements in FIGS. 3A-3C and in group $137_{Group\ 1}$ of FIG. 3D may be illustrated as generally being collectively arranged in a T-shape, the inventive entity appreciates that the antenna elements may be collectively arranged in any shape (including a rectangle, a square, or even a shape that appears to be random). The inventive entity further appreciates that a surface of an array antenna described herein may be circular/curved (e.g., semi-spherical, semi-cylindrical, etc.) rather than flat in some embodiments, and that the arrangement of antenna elements on the surface thus is not limited to rows or columns, but rather that the antenna elements may be arranged on the surface at various radius/angular locations of the surface.

Figure 3E:
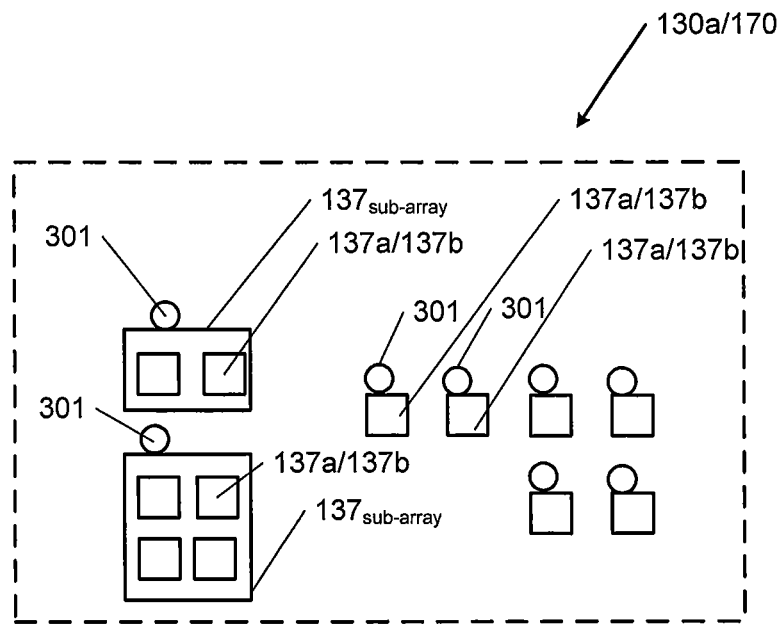

Referring now to FIG. 3E, a diagram illustrates an example of two different sub-arrays $137_{sub\text{-}array}$ of FIG. 3D. In particular, FIG. 3E illustrates one sub-array $137_{sub\text{-}array}$ that includes two antenna elements (e.g., the antenna elements 137a/137b) and another sub-array $137_{sub\text{-}array}$ that includes four antenna elements. FIG. 3E also illustrates that the plurality of antenna elements of each sub-array $137_{sub\text{-}array}$ are coupled to the same antenna feed 301. On the other hand, FIG. 3E illustrates that each antenna element (e.g., each antenna element 137a/137b) in group $137_{Group\ 1}$ (illustrated in FIG. 3D) is coupled to a different antenna feed 301.

Figure 3F:
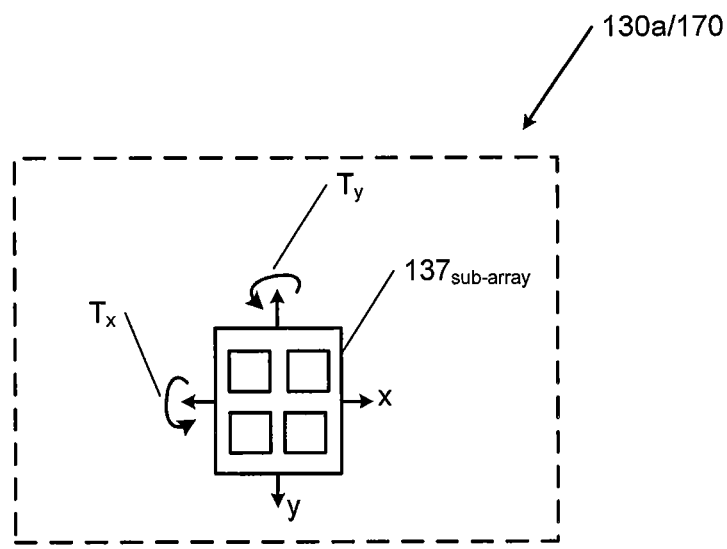

Referring now to FIG. 3F, the inventive entity appreciates that an array antenna (or any group of antenna elements therein) may be tilted to achieve a particular antenna characteristic (e.g., to direct/focus an antenna radiation pattern at a particular angle). As an example, FIG. 3F illustrates that one or more sub-arrays $137_{sub\text{-}array}$ of FIG. 3D may be configured to be controlled by a processor/circuit to mechanically tilt, in coordination with, or independently of, tilting other antenna elements in the antenna system 137. For example, referring to FIGS. 3D and 3F, a sub-array $137_{sub\text{-}array}$ of the group $137_{Group\ 2}$ is configured to mechanically tilt independently of the group $137_{Group\ 1}$ and the group $137_{Group\ 3}$. Moreover, a sub-array $137_{sub\text{-}array}$ of the group $137_{Group\ 2}$ may be configured to mechanically tilt independently of other sub-arrays $137_{sub\text{-}array}$ of the group $137_{Group\ 2}$. As illustrated in FIG. 3F, a sub-array $137_{sub\text{-}array}$ may be configured to tilt about the x-axis (as illustrated by the tilt $T_x$) and/or about the y-axis (as illustrated by the tilt $T_y$). Moreover, referring to any of FIGS. 3A-3F, the inventive entity appreciates that at least one of the antenna elements of any antenna system 137 (whether including a sub-array $137_{sub\text{-}array}$ or not) may be configured to be controlled by a circuit to mechanically tilt independently of other ones of the antenna elements. Additionally or alternatively, at least one of the antenna elements of any antenna system 137 (whether including a sub-array $137_{sub\text{-}array}$ or not) may be arranged/printed on a surface to have a tilt angle (e.g., with respect to the surface) different from other ones of the antenna elements, independently of any control by any circuit. For example, at least one antenna element 137a/137b may have a different tilt angle with respect to a surface on which a plurality of antenna elements 137a/137b are located than a tilt angle of at least one other antenna element 137a/137b with respect to the surface.

Figure 4A:
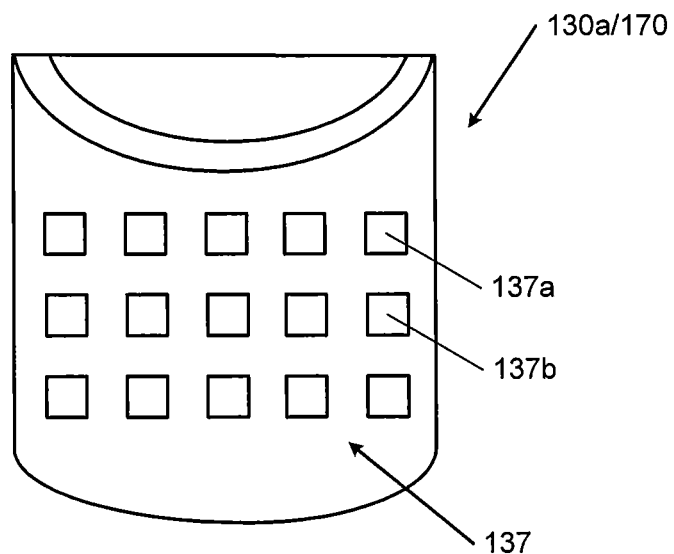
FIGS. 4A and 4B illustrate diagrams of irregular array antennas that are on semi-cylindrical and U-shaped surfaces, respectively.
Figure 4B:
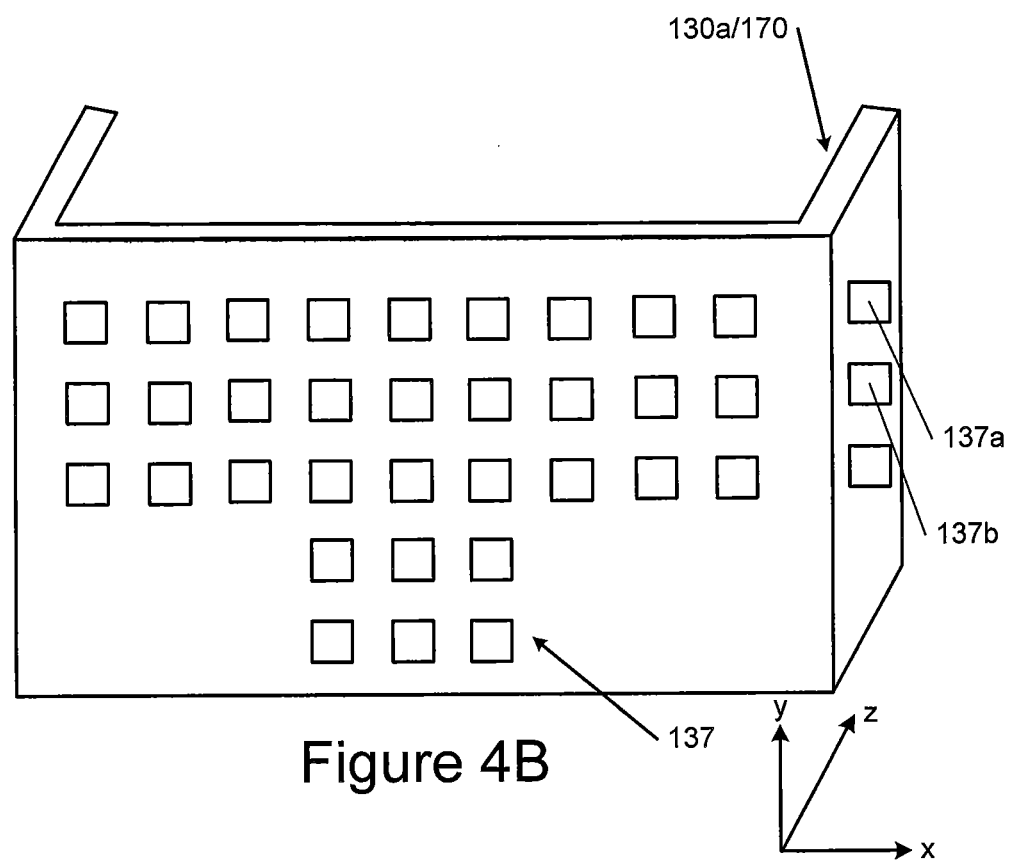

Referring now to FIGS. 4A and 4B, diagrams are provided illustrating irregular array antennas that are on semi-cylindrical and U-shaped surfaces, respectively. In particular, FIG. 4A illustrates a cellular base station 130a (or a wireless local area network base station 170) having different types of antenna elements 137a and 137b in an antenna system 137 on a semi-cylindrical surface. The inventive entity appreciates, however, that any of the irregular antenna arrays illustrated in FIGS. 3A-3F may be provided on the surfaces illustrated in FIGS. 4A and 4B. Moreover, although FIG. 4A illustrates a semi-cylindrical (e.g., half-cylindrical) surface, the antenna elements 137a/137b of the irregular array antenna may alternatively be on a semi-spherical (e.g., half-spherical) surface.

Also, FIG. 4B illustrates a cellular base station 130a (or a wireless local area network base station 170) having different types of antenna elements 137a and 137b in an antenna system 137 on a U-shaped (e.g., a shape of a rectangle with a missing fourth side) surface. For example, whereas the antenna system 137 of FIG. 3A is on a surface in the x-y plane, the antenna system of FIG. 4B is on one or more surfaces in the y-z plane in addition to the surface in the x-y plane. Accordingly, the flat array antennas (e.g., array antennas with antenna elements on a flat surface) illustrated in FIGS. 3A-3F may optionally be bent/curved as illustrated in FIGS. 4A and 4B. In some embodiments, the antenna elements 137a/137b may be flat/planar elements that face in different directions. For example, antenna elements 137a/137b in the y-z plane may face the x-direction, whereas antenna elements 137a/137b in the x-y plane may face the z-direction. Alternatively, at least some of the antenna elements 137a/137b may be curved, and different ones of the antenna elements 137a/137b may have different radii of curvature, respectively. Moreover, in some embodiments, a cellular base station 130a (or a wireless local area network base station 170) having an irregular array antenna, as illustrated in any of FIGS. 3A-4B, may be wall-mountable/roof-mountable (e.g., a flat irregular array antenna may be mounted on the roof of a building and used to replace a spherical array).

Figure 5A:
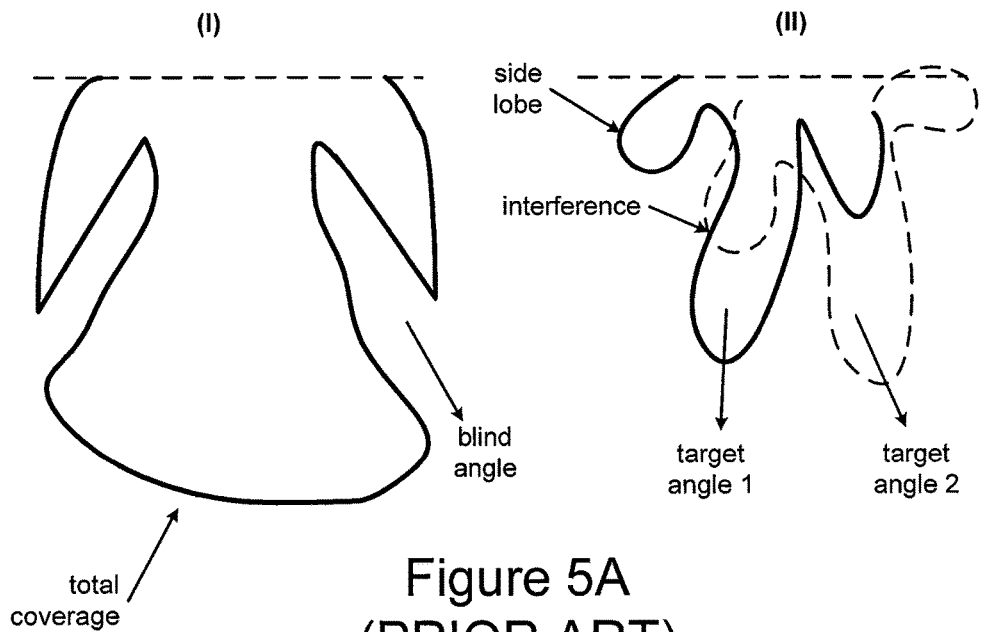
FIGS. 5A and 5B illustrate the performance of a uniform array antenna, according to the prior art, and the performance of an irregular array antenna, according to some embodiments of present inventive concepts, respectively.
Figure 5B:
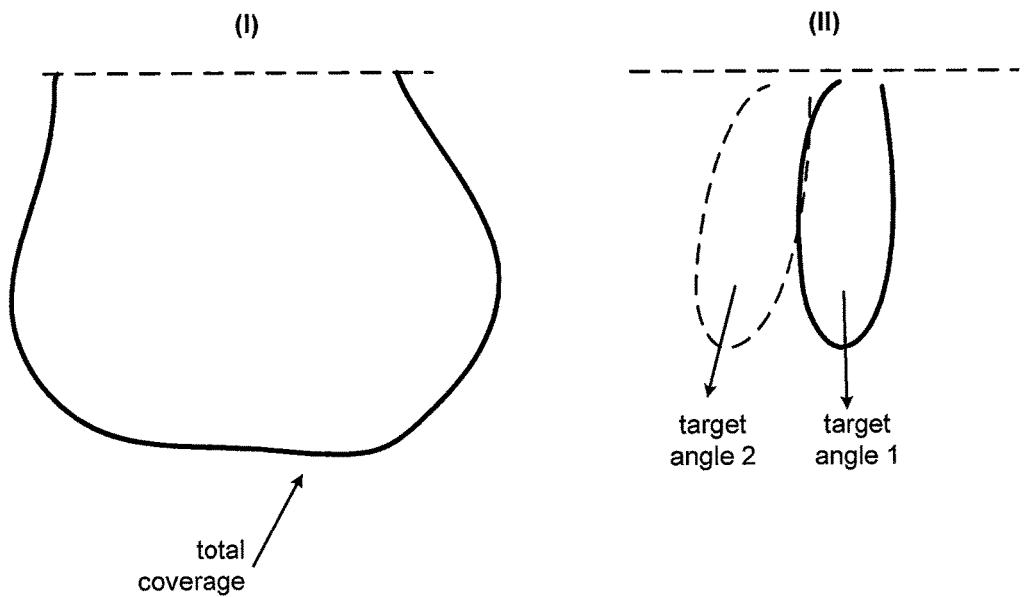

Referring now to FIGS. 5A and 5B, illustrations are provided of (i) the performance of a flat array antenna having uniform antenna elements and (ii) the performance of an irregular array antenna according to some embodiments of present inventive concepts, respectively. In particular, FIG. 5A illustrates the performance of an array antenna according to FIG. 2B, whereas FIG. 5B illustrates the performance of an irregular array antenna as illustrated in any of FIGS. 3A-4B according to some embodiments of present inventive concepts.

For example, FIG. 5A illustrates (I) that the uniform antenna elements 237 of FIG. 2A provide a total antenna coverage that includes one or more blind angles (e.g., one or more angle without maximum gain). Moreover, FIG. 5A further illustrates (II) that attempting to provide antenna coverage for two different target angles via the uniform antenna elements 237 of FIG. 2A may result in side lobes (e.g., where antenna energy is directed away from a target angle), as well as interference with antenna beams/energy at the target angles. FIG. 5B, on the other hand, provides (I) improved gain (e.g., better gain across a wider spectrum of angles) for a total antenna coverage of the irregular array antenna, as well as (II) antenna beams/energy that are focused to align with a plurality of target angles and to have reduced side lobes and reduced interference.

Accordingly, in comparison with FIG. 5A, FIG. 5B illustrates that an irregular antenna array of a cellular base station 130a (or a wireless local area network base station 170) according to some embodiments of present inventive concepts can provide improved total antenna coverage to wireless electronic devices 100, as well as improved ability to steer antenna beams in different directions (e.g., as illustrated by the beams and target angles of FIG. 5B). In other words, the irregular antenna array may (A) reduce blind angles, (B) provide improved coverage (e.g. 180 degrees, or almost 180 degrees, of coverage), (C) reduce/cancel side lobes, and (D) reduce interference with other devices.

Various embodiments described herein provide improved antenna performance by using a large, irregular array of antenna elements. For example, an irregular array described herein may include hundreds (e.g., at least one hundred), or even thousands (e.g., at least one thousand), of antenna elements in some embodiments, and may thus be referred to as a massive MIMO irregular array antenna. In particular, referring to FIGS. 1B and 1C, the transceiver circuitry 139 may be massive MIMO transceiver circuitry coupled to the antenna system 137 having a massive MIMO irregular array of antenna elements. Moreover, the entire antenna system 137 having the massive MIMO irregular array of antenna elements may be on a common, continuous surface (i.e., the same, uninterrupted surface) such as a monolithic (i.e., one-piece) surface/panel. In other words, all antenna elements 137a/137b of the antenna system 137 may be on the same flat surface illustrated in any of FIGS. 3A-3D, or the same non-planar surface illustrated in FIG. 4A or FIG. 4B.

The massive MIMO irregular array antenna may provide communications for a cellular base station or a short-range wireless communications base station. Moreover, although it may be possible to arrange antenna elements in a line-of-sight (LoS)-based communication device (rather than in a cellular base station or a Wi-Fi base station, etc.) in an irregular array, such an irregular array may not be random in a LoS-based communication device (e.g., in a satellite, conventional beam forming). In particular, the arrangement of antenna elements in a LoS-based communication device may be non-random because it may require calculating how to provide an antenna beam via the particular arrangement of the antenna elements, and this may become even more complicated when mobility is considered. The antenna elements of a massive MIMO irregular array antenna (e.g., a non-satellite massive MIMO irregular array antenna) according to various embodiments described herein, however, may be randomly placed/arranged on a surface (e.g., a flat/planar surface) thereof because it is not necessary to pre-calculate the phase and amplitude of a signal for each of these antenna elements.

Specifically, instead of needing to pre-calculate the phase and amplitude of a signal for each of the antenna elements, the antenna elements of a massive MIMO irregular array antenna according to various embodiments described herein can be calibrated/steered with a pilot signal. In other words, according to various embodiments described herein, an irregular array antenna (e.g., a flat irregular array antenna) may be combined with massive MIMO pilot-signal-based element steering. For example, in comparison with antenna elements of a LoS-based communication device, the antenna elements in the massive MIMO irregular array antenna according to various embodiments described herein may be fed with a signal that is based on/calibrated with an uplink pilot signal. Accordingly, the massive MIMO irregular array antenna can be an array of random antenna elements, whereas it may be necessary to calculate how to feed antenna elements of a LoS-based communication device.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

What is claimed is:

1. A network node comprising:
   transceiver circuitry configured to provide communications in a cellular or short-range wireless network; and
   a non-uniform plurality of array antenna elements on a common, continuous flat plane and coupled to the transceiver circuitry, the non-uniform plurality of array antenna elements comprising a plurality of columns and/or a plurality of rows of array antenna elements on the common, continuous flat plane,
   wherein sizes of the non-uniform plurality of array antenna elements, antenna types of the non-uniform plurality of array antenna elements, and/or tilt angles of the non-uniform plurality of array antenna elements differ among the non-uniform plurality of array antenna elements,
   wherein the non-uniform plurality of array antenna elements comprises at least one hundred antenna elements on the common, continuous flat plane,
   wherein the plurality of columns and/or plurality of rows of array antenna elements comprises a first group of the non-uniform plurality of array antenna elements adjacent a second group of the non-uniform plurality of array antenna elements,
   wherein the first group comprises an array comprising the plurality of columns and/or plurality of rows of antenna elements,
   wherein each antenna element in the array is coupled to a different antenna feed, and wherein the second group comprises a sub-array comprising a plurality of antenna elements that are coupled to a same antenna feed.

2. The network node of claim 1, wherein the non-uniform plurality of array antenna elements comprises a patch antenna element and a monopole antenna element.

3. The network node of claim 1, wherein the sub-array is configured to be controlled by the circuit to mechanically tilt independently of the first group of the non-uniform plurality of antenna elements.

4. The network node of claim 1, further comprising a processor coupled to the transceiver circuitry and configured to:
   receive an uplink pilot signal; and
   feed the non-uniform plurality of array antenna elements with a signal that is based on the uplink pilot signal.

5. The network node of claim 1, wherein the transceiver circuitry comprises massive Multiple-Input Multiple-Output (MIMO) cellular base station transceiver circuitry coupled to the non-uniform plurality of array antenna elements.

6. The network node of claim 1, wherein the transceiver circuitry comprises Wi-Fi base station transceiver circuitry coupled to the non-uniform plurality of array antenna elements.

7. The network node of claim 1, wherein some, but not all, of the non-uniform plurality of array antenna elements comprise patch antenna elements.

8. The network node of claim 1,
   wherein the sub-array comprises a first sub-array comprising a first plurality of antenna elements that are coupled to a first same antenna feed, and
   wherein the second group further comprises a second sub-array comprising a second plurality of antenna elements that are coupled to a second same antenna feed.

9. The network node of claim 8, further comprising a third group comprising third and fourth sub-arrays comprising third and fourth pluralities of antenna elements, respectively,
   wherein the third plurality of antenna elements are coupled to a third same antenna feed,
   wherein the fourth plurality of antenna elements are coupled to a fourth same antenna feed, and
   wherein the array comprising the plurality of columns and/or plurality of rows of antenna elements is between the second and third groups of sub-arrays.

* * * * *